(12) United States Patent
Davis (10) Patent No.: US 9,221,405 B2
(45) Date of Patent: Dec. 29, 2015

(54) MULTI-FUNCTION ELECTRONIC DISPLAY LICENSE PLATE SYSTEM

(71) Applicant: Donnell A. Davis, Bowie, MD (US)

(72) Inventor: Donnell A. Davis, Bowie, MD (US)

(*) Notice: Subject to any disclaimer, the term of this patent is extended or adjusted under 35 U.S.C. 154(b) by 0 days.

(21) Appl. No.: 13/938,434

(22) Filed: Jul. 10, 2013

(65) Prior Publication Data

US 2014/0249713 A1 Sep. 4, 2014

Related U.S. Application Data

(60) Provisional application No. 61/772,230, filed on Mar. 4, 2013.

(51) Int. Cl.
| | | |
|---|---|---|
| *G06F 7/00* | (2006.01) | |
| *B60R 13/10* | (2006.01) | |
| *B60R 25/00* | (2013.01) | |

(52) U.S. Cl.
CPC ................ *B60R 13/10* (2013.01); *B60R 25/00* (2013.01)

(58) Field of Classification Search
CPC ............................... B60R 13/10; B60R 25/01
USPC .................. 701/36; 345/38, 37, 39, 467, 470; 340/426.1, 426.18, 468
See application file for complete search history.

(56) References Cited

U.S. PATENT DOCUMENTS

| | | | | | |
|---|---|---|---|---|---|
| 5,105,179 A | * | 4/1992 | Smith | ...................... | B60Q 1/56 340/461 |
| 5,396,233 A | * | 3/1995 | Hofmann | ............. | G07C 5/0858 235/384 |
| 5,608,391 A | * | 3/1997 | Bantli | ..................... | B60R 13/10 340/933 |
| 5,657,008 A | * | 8/1997 | Bantli | .................... | G08G 1/017 340/933 |
| 5,963,129 A | * | 10/1999 | Warner | .................. | G08G 1/205 340/10.42 |
| 6,404,327 B1 | * | 6/2002 | Naddeo | .................. | B60R 13/10 340/426.11 |
| 6,922,137 B1 | * | 7/2005 | Bycroft | ............... | B60Q 1/2692 340/425.5 |
| 7,096,102 B1 | * | 8/2006 | Parker, Sr. | ............ | B60R 25/105 340/426.1 |
| 7,117,075 B1 | * | 10/2006 | Larschan | ............... | G06Q 10/06 340/438 |
| 7,161,563 B2 | * | 1/2007 | Vitale | ...................... | B60Q 1/56 340/425.5 |
| 7,301,441 B2 | * | 11/2007 | Inada | .................. | B60R 25/2081 307/10.1 |
| 7,952,463 B2 | * | 5/2011 | Terao | ...................... | B60R 25/04 307/10.4 |
| 8,190,324 B2 | * | 5/2012 | Hattori | ............... | G07C 9/00309 340/438 |
| 8,289,142 B2 | * | 10/2012 | Pawlicki | ................ | G08G 1/167 340/435 |
| 8,634,822 B2 | * | 1/2014 | Silver | ................ | H04M 1/72577 340/439 |

(Continued)

*Primary Examiner* — Khoi Tran
*Assistant Examiner* — Jorge Peche
(74) *Attorney, Agent, or Firm* — Terry M. Sanks, Esq.; Beusse Wolter Sanks & Maire, PLLC (57) ABSTRACT

Systems, methods, and computer program products for displaying license plate information and regulating the use of a vehicle's license plate through the use of a multi-function electronic display license plate system are disclosed. In an aspect of the present disclosure, the multi-function electronic display license plate system utilizes a combination of motion sensors, position sensors, identification verification systems, and the like to allow a vehicle owner to regulate who may use the vehicle, while providing for a safer and more efficient use of the vehicle.

20 Claims, 6 Drawing Sheets

(56) References Cited

U.S. PATENT DOCUMENTS

| | | | | |
|---|---|---|---|---|
| 2001/0040506 A1* | 11/2001 | Boulay | ............... | B60R 25/1018 340/539.1 |
| 2002/0004720 A1* | 1/2002 | Janoska | ................ | G10L 13/00 704/270 |
| 2002/0022927 A1* | 2/2002 | Lemelson | ............... | G01S 19/11 701/301 |
| 2002/0152010 A1* | 10/2002 | Colmenarez | ........ | B60R 25/2045 701/36 |
| 2003/0137409 A1* | 7/2003 | Kikkawa | ................ | B60R 25/04 340/426.11 |
| 2004/0004539 A1* | 1/2004 | Collins | ................ | B60R 25/102 340/425.5 |
| 2004/0189493 A1* | 9/2004 | Estus | ....................... | G08G 1/20 340/988 |
| 2004/0263357 A1* | 12/2004 | Hamilton | ................ | G08G 1/01 340/936 |
| 2007/0008084 A1* | 1/2007 | Wu | ........................ | G08G 1/017 340/425.5 |
| 2007/0038353 A1* | 2/2007 | Larschan | ............... | G07C 5/085 701/33.4 |
| 2007/0136900 A1* | 6/2007 | Watters | .................... | B60R 13/10 |
| 2007/0171037 A1* | 7/2007 | Schofield | ................ | B60C 23/00 340/438 |
| 2008/0212215 A1* | 9/2008 | Schofield | ................ | B60C 23/00 359/844 |
| 2009/0119599 A1* | 5/2009 | Hazen | .................... | G06Q 30/02 715/738 |
| 2010/0280711 A1* | 11/2010 | Chen | ..................... | B60R 16/037 701/36 |
| 2012/0062744 A1* | 3/2012 | Schofield | ................ | B60C 23/00 348/148 |
| 2012/0181340 A1* | 7/2012 | Hsu | ......................... | B60R 13/10 235/492 |
| 2013/0006775 A1* | 1/2013 | Jordan | ............... | G06Q 30/0265 705/14.62 |
| 2013/0042966 A1* | 2/2013 | Look | ....................... | B32B 37/12 156/227 |

* cited by examiner

MULTI-FUNCTION ELECTRONIC DISPLAY LICENSE PLATE SYSTEM

CROSS-REFERENCE TO RELATED APPLICATION

This application claims the benefit of U.S. Provisional Patent Application No. 61/772,230, filed Mar. 4, 2013, and entitled "Multi-Function Electronic Display License Plate System," the entire contents of which is incorporated herein by reference.

FIELD OF THE DISCLOSURE

The present disclosure generally relates to vehicle registration identifiers, and more particularly to systems, methods, and computer program products for displaying vehicle registration information and regulating the use of a vehicle in relation to such information.

BACKGROUND

The statements in this section merely provide background information related to the present disclosure and may not constitute prior art.

For more than one hundred years, vehicle registration plates (also known as license plates; tags; and number plates) have been affixed to vehicles in order to identify the registration of the vehicle. Such plates are typically constructed of painted metal or other durable material and produced en masse before entering service on a registered vehicle, necessitating constant stockpiling and distribution of thousands of physical license plates. Furthermore, many jurisdictions require reissuance of license plates (also known as replating) on a regular basis, thereby complicating vehicle registration plate-related logistics. Replating increases the number of vehicle registration plates which must be manufactured, stockpiled and distributed, and contributes to environmental waste. Finally, a majority of states in the United States require both front and rear license plates for automobiles, effectively doubling the number of plates which must be produced, replaced, and eventually disposed.

A typical vehicle registration plate displays at least some of the following information: registration number; expiration date; state of issue; and county of issue. In many cases, publicly owned/operated vehicles are required to have specialized license plates which may display one or more of the following: a license plate number; expiration date; state of issue; county of issue; issuing authority (e.g., government branch, government agency, and the like); the appropriate government agency insignia; and the like. At the federal level, license plates for government vehicles are manufactured by UNICOR, also known as the Federal Prison Industries, a wholly-owned United States government corporation. UNICOR uses "penal labor" with the goal of helping inmates learn transferable vocational skills that they can utilize upon the completion of theft prison sentences in what is known as the Post Release Employment Project (PREP). In many U.S. states, license plates are also made by state prison inmates under the same rationale.

Living in today's technological era, however, not only are the metal license plates outdated, but so too is the method of achieving the primary goal of PREP. The traditional metal license plate, in a government agency setting, is subject to various limitations and inefficiencies, including: current policies which prohibit license plates from being transferred between vehicles; national security issues that can arise if a license plate is stolen; and unnecessary security exposure regarding license plate disposal through UNICOR. Further, the goal of providing "transferable vocational skills" which an inmate can "utilize upon the completion of their prison sentence" is not being met by learning how to manufacture metal license plates. Of the 133 million Americans in the US workforce, less than 12 million were employed in manufacturing jobs. Attempting to facilitate the reentry of inmates into the workforce by providing them with a skill that is applicable to less than 10% of available jobs falls short of the aim of programs like PREP and fails to realize the technologically-driven realities of the $21^{st}$ century American economy. Vocational training in the areas of electronics, for example, would be more beneficial to many inmates upon their release.

Electronics have developed drastically since license plates were initially implemented over 100 years ago, but the government's license plate system has not advanced at the same rate as technology in general. For example, many of today's vehicles have sophisticated on-board computer systems to facilitate real-time vehicle health diagnostics. Such systems may include navigation units and have touchscreens and other input devices to control various vehicle subsystems. Despite the widespread dissemination and deep integration of electronics into modern vehicles, there have been no similar computer-based advances in vehicle registration plates.

Given the foregoing, systems, methods, and computer program products are needed for displaying license plate information and regulating the use of a vehicle through the use of an electronic display license plate system.

Additionally, systems, methods, and computer program products are needed which facilitate production of license plate information display devices while reducing waste, lessening logistical burdens, and, where inmates produce such devices, providing useful vocational skills for inmates.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

The present disclosure meets the above-identified needs by providing systems, methods, and computer program products for displaying license plate information and regulating the use of a vehicle's license plate through the use of a multi-function electronic display license plate system.

In an aspect, a multi-function electronic display license plate system is provided that allows, for example, government agencies to increase security beyond present capabilities by, for example, programming into each vehicle a list of "authorized users" to ensure that the vehicles are only being operated by certain, preauthorized drivers. When vehicles equipped with such a license plate system are operated by the authorized person, license plate information is displayed. When an unauthorized person attempts to operate the vehicle, license plate information will not be displayed.

In several aspects, the systems of the present disclosure can be integrated into a vehicle during the manufacturing process which will allow the vehicle manufacturers to build electronic display license plates into the rear and/or front-end of the vehicles. In another aspect, systems and devices produced in accordance with the present disclosure are produced as add-on devices which may be mounted to a vehicle in place of a traditional license plate. Such systems may be updated to display new information. That is, a single device may be used for decades by multiple owners without needing replacement, thereby reducing the waste associated with traditional metal license plates.

Both the integrated system and the add on system may be produced by inmates via a PREP program or similar program. In this manner, inmates gain valuable electronics-related vocational skills. These skills have a much broader application and value in today's American workforce, increasing the likelihood of an inmate reintegrating with society after their incarceration because they are more likely to secure employment.

In an aspect of the present disclosure, a motorized vehicle, such as a passenger car or truck, is manufactured to include an electronic display license plate system. The electronic display license plate system will be programmable to display license plate information such as, but not limited to: license plate identification number; license plate registration expiration date; State of registration; county of registration; specialized (or vanity) license plate background display (e.g., a sports team, fraternity, social club, university, association, organization or government agency logo); other required information based on the federal, state or local municipality issuing or regulating the license plates; and the like.

In an aspect, the electronic display license plate system may be powered through a connection to the vehicle's electrical systems. Such devices may be designed to operate on an independent power source, such as a battery, photovoltaic system, and the like. The independent power source may be incorporated into the electronic display license plate system during the electronic display license plate system's manufacturing process or may be attached to the electronic display license plate system at some point following the completion of the electronic display license plate system's manufacturing process.

In another aspect, an electronic display license plate system may be attached to a vehicle (i.e., added on) at some point following the completion of the vehicle's manufacturing process. As will be apparent to those having skill in the relevant art(s) after reading the description herein, the electronic display license plate system can be attached to a vehicle's electrical system by a variety of methods or may be designed to operate on an independent power source. The independent power source may be incorporated into the electronic display license plate system during the electronic display license plate system's manufacturing process or may be attached to the electronic display license plate system at some point following the completion of the electronic display license plate system's manufacturing process or may be intermittently attached in order to recharge the system, alter the system, or for some other reason.

In another aspect, the electronic display license plate system comprises an incorporated electronic display message center configured to allow the user of the vehicle to display emergency messages. For example, the message center can be programmed to display preset messages (e.g., "ROADSIDE ASSISTANCE NEEDED") or the message center may be programmed to display custom messages provided by the operator of the vehicle through any input method, such as a dashboard-implemented touch screen, an onboard keyboard, mobile device, mouse, joystick, voice recognition system or the like.

In yet another aspect, the electronic display license plate system will be connected to a user identification system, such as a smart card reader, which will only allow the electronic display license plate system to activate for authorized users. In such an aspect, an electronic display license plate system may, for example, remain deactivated until the vehicle's user verifies their authorization by performing an action such as swiping theft smart card through a smart card reader, scanning theft fingerprint on a fingerprint reader, utilizing another form of biometric scanner, providing a password, utilizing a verification device to authenticate authorization, or the like.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

DETAILED DESCRIPTION

The present disclosure is directed to systems, methods, and computer program products for displaying license plate information and regulating the use of a vehicle's license plate through the use of a multi-function electronic display license plate system.

Figure 1:
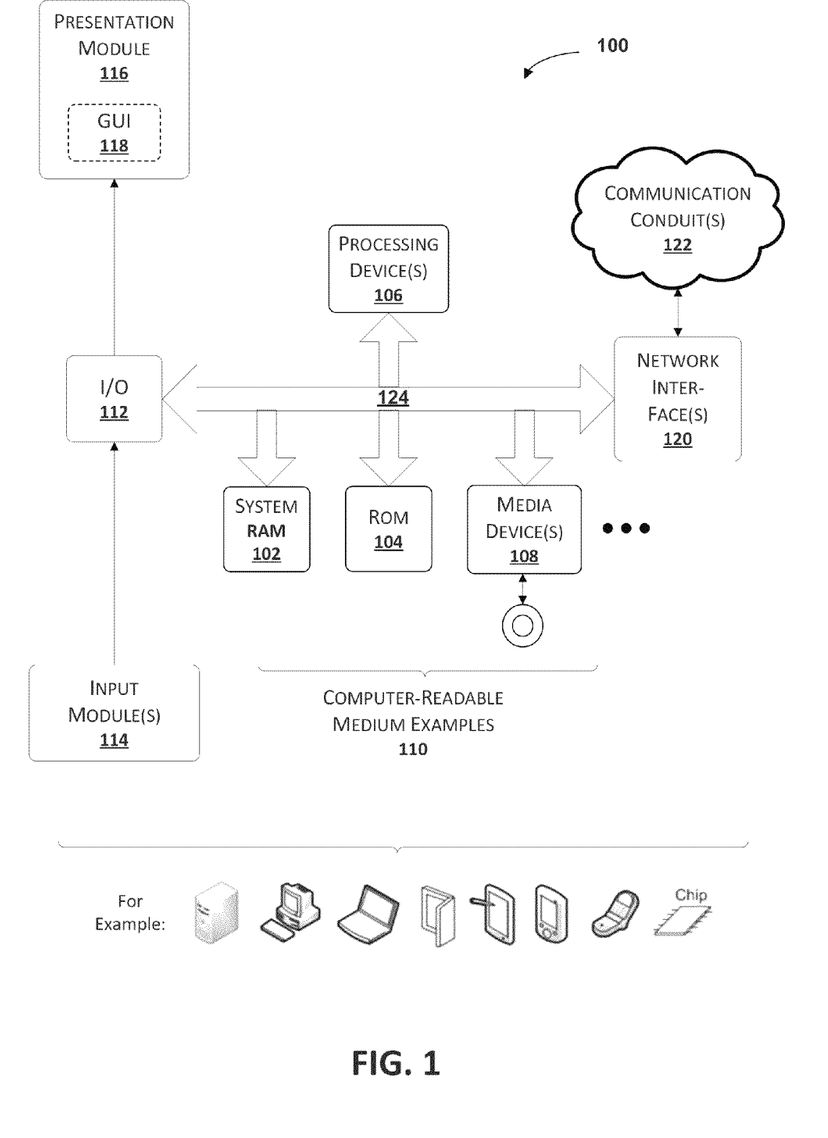
FIG. 1 is a block diagram of an exemplary computer system useful for implementing the present disclosure.

Referring to FIG. 1, a block diagram of an exemplary computer system useful for implementing various aspects of the processes disclosed herein, in accordance with one or more aspect of the present disclosure, is shown. That is, in an aspect, FIG. 1 sets forth illustrative oft-board computing functionality 100 that may be used as part of the system of the present disclosure to configure, control and generally communicate with an electronic display license plate such as the one disclosed in U.S. Pat. No. 5,105,179, which is hereby incorporated by reference in its entirety.

Computing functionality 100 may comprise volatile and non-volatile memory, such as RAM 102 and ROM 104, as well as one or more processing devices 106 (e.g., one or more central processing units (CPUs), one or more graphical processing units (GPUs), and the like). Computing functionality 100 also optionally comprises various media devices 108, such as a hard disk module, an optical disk module, and so forth. Computing functionality 100 may perform various operations identified above when the processing device(s) 106 execute(s) instructions that are maintained by memory (e.g., RAM 102, ROM 104, and the like).

More generally, instructions and other information may be stored on any computer readable medium 110, including, but not limited to, static memory storage devices, magnetic storage devices, and optical storage devices. The term "computer readable medium" also encompasses plural storage devices. In all cases, computer readable medium 110 represents some form of physical and tangible entity. By way of example, and not limitation, computer readable medium 110 may comprise "computer storage media" and "communications media."

"Computer storage media" comprises volatile and nonvolatile, removable and non-removable media implemented in any method or technology for storage of information, such as computer readable instructions, data structures, program modules, or other data. Computer storage media may be, for example, and not limitation, RAM 102, ROM 104, EEPROM, Rash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 100 may also comprise an input/output module 112 for receiving various inputs (via input modules 114), and for providing various outputs (via one or more output modules). One particular output module mechanism may be a presentation module 116 and an associated GUI 118. Computing functionality 100 may also include one or more network interfaces 120 for exchanging data with other devices via one or more communication conduits 122. In some aspects, one or more communication buses 124 communicatively couple the above-described components together.

Communication conduit(s) 122 may be implemented in any manner (e.g., by a local area network, a wide area network (e.g. the Internet), and the like, or any combination thereof). Communication conduit(s) 122 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices.

Figure 2:
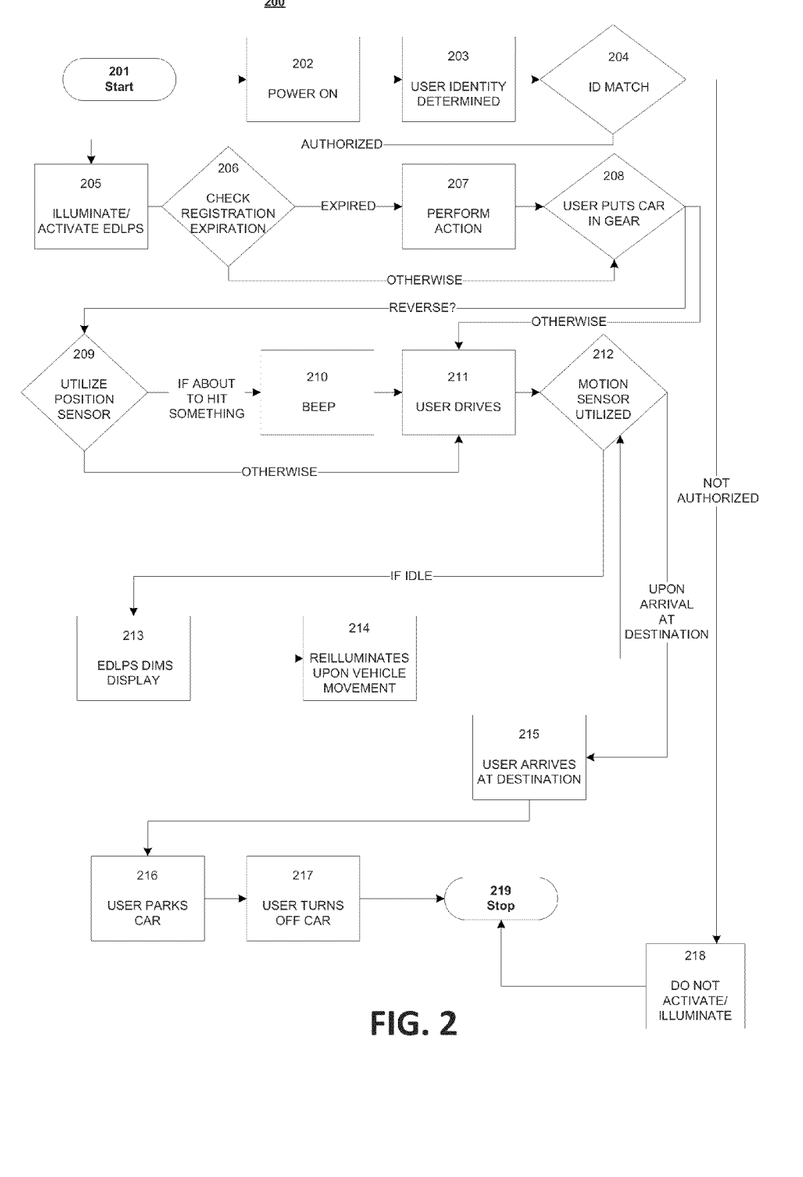
FIG. 2 is a flowchart illustrating an exemplary process for utilizing a multi-function electronic display license plate system, according to an aspect of the present disclosure.

Referring now to FIG. 2, a flowchart illustrating an exemplary process 200 for utilizing an electronic display license plate system, according to an aspect of the present disclosure, is shown.

As will be appreciated by those skilled in the relevant art(s) after reading the description herein, computing functionality 100 capable of performing process 200 described below may integrated into a vehicle during the initial manufacturing process or installed "aftermarket" by an entity/organization/agency/operator desiring to perform fleet or individual vehicle management of its vehicle(s) as described in the present disclosure.

Process 200, which may be carried out on portions of computing functionality 100, begins at step 201 with control immediately passing to step 202.

In step 202, a user starts a vehicle through inserting and turning a key, by a push-to-start mechanism, or the like. The vehicle may be an automobile, truck, trader, all-terrain vehicle, motorcycle, vessel, aircraft, or the like. In step 203, the user's identification is verified using an input module 114 such as, but not limited to, a smart card reader, a fingerprint reader, a text input device (e.g., keypad, keyboard, touchscreen, and the like), an audio input device, a camera, a recording device, or the like. The input module may be utilized by the user providing one or more passwords, biometric data, providing job-related identifying information (e.g., employee identification number) and the like. In an aspect, input module receives information from a mobile device, such as a mobile phone, via Bluetooth communication, near-field communications protocols, or the like.

In step 204, computing functionality 100 compares the user-supplied information received by input module 116 to information maintained in an authorization database. If the user is an authorized user, as indicated by comparison step 204, process 200 continues to step 205. If the user is not an authorized user, process 200 continues to step 218. In step 218, computer system 100 does not receive an instruction to activate the display mechanism of the present disclosure and process 200 terminates. That is, in step 218, a multi-function electronic display license plate communicatively attached to computing functionality 100 does not activate, preventing the user from legally operating the vehicle.

In step 205, the user is authorized to operate the vehicle and computer system 100 receives an instruction to activate the display module 116 and the various sensors of the present disclosure. In an aspect, display module is the electronic display license plate system and is configured to display license plate information. The electronic display license plate system is described in more detail in conjunction with FIG. 3 below. In another aspect, display module 116 is a visual display device located in the vehicle positioned to be viewed by the user and displaying electronic display license plate system status, vehicle registration status, and the like. Such a display may be separate from other audiovisual equipment contained in the vehicle or coextensive with, or integrated into, such equipment.

In step 206, following the activation of display module 116, computer system 100 compares the present date information to information maintained in a vehicle registration database.

If the vehicle's registration information indicates that the vehicle's registration is expired, process 200 continues to step 207 before continuing to step 208. If the vehicle's registration information indicates that the vehicle's registration is currently valid, process 200 continues to step 208. In step 207, computer system 100 causes display module 116 to perform an action indicating that the registration is expired. Said action includes, but is not limited to, causing the display to flash or invert, illuminating a light inside the vehicle to alert the user and/or the like.

In step 208, the user shifts the vehicle into the selected gear. If the selected gear is "reverse," process 200, proceeds to step 209. If the selected gear is any gear other than "reverse," process 200 proceeds to step 211. In step 209, computer system 100 will utilize position sensors to assist the user of the vehicle while in the "reverse" gear. Said position sensors will monitor the space behind the vehicle while the user backs up. If an item comes within the range of the position sensors, process 200 will proceed to step 210. If no item comes within the range of the position sensors, process 200 will proceed to step 211. In step 210, computer system 100 will send a signal to the vehicle causing a warning action, such as a beeping sound, to occur within the vehicle so as to inform the user that appropriate action is needed (e.g., stop reversing). Following the warning, once the user switches into a gear other than "reverse," process 200 continues to step 211.

In step 211, the user begins operating the vehicle. As soon as operation of the vehicle begins, process 200 proceeds to step 212. In step 212, computer system 100 utilizes motion sensors to determine whether the vehicle remains in a still position (i.e., idle) for a predetermined amount of time. Said predetermined amount of time may be programmed into computer system 100. If at any time during its operation, the vehicle remains idle for said predetermined amount of time, process 200 continues to step 213. If the vehicle is not idle for the predetermined duration at any time during the operation of the vehicle, process 200 continues to step 215.

In step 213, computer system 100 will send an instruction to the display module 116 instructing said presentation module to perform an action, such as, but not limited to, dimming the display. One the motion sensors detect further movement, process 200 continues to step 214 where computer system 100 sends an instruction to display module 116 to resume full illumination. As will be apparent to those skilled in the relevant art(s) after reading the description herein, the sub-process defined by steps 212-214 is designed to repeat until process 200 continues from step 212 to step 215 when the user arrives at the desired destination. Process 200 continues to step 216 when the user shifts the vehicle back into "park." Then in step 217, the user deactivates (i.e., turns off) the vehicle and process 200 terminates at step 219.

As will be appreciated by those skilled in the relevant art(s) after reading the description herein, in aspects of the present disclosure, on-board computing functionality may communicate, via a mobile, cellular, satellite or other communications network, with one or more vehicle registration, authorization and configuration databases maintained by the owner (e.g., government agency) of the vehicle(s) in question. In alternate aspects of the present disclosure, such databases are maintained and provisioned by an Application Service Provider (ASP) implementing the present disclosure and allowing access on a paid subscriber/membership and/or pay-per-use basis. As will also be appreciated by those skilled in the relevant art(s) after reading the description herein, in aspects, the multi-functional electronic display license plate of the present disclosure is portable and easily programmable; thus, it is usable by multiple government agencies or private entities resulting in improved vehicle utilization and reduced operational costs.

Figure 3:
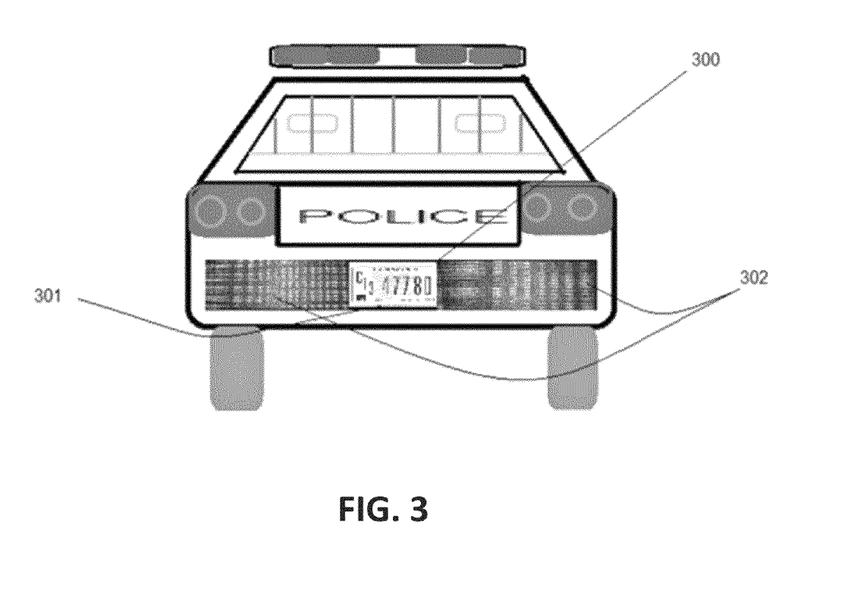
FIG. 3 is diagram of an exemplary vehicle rear-end layout of the multi-function electronic display license plate system, according to an aspect of the present disclosure.

Referring now to FIG. 3, an exemplary vehicle rear-end layout of the multi-function electronic display license plate system, according to an aspect of the present disclosure, is shown. The multi-function electronic display license plate system 300 has an incorporated electronic display license plate 301 (such as the one disclosed in U.S. Pat. No. 5,105,179, which is hereby incorporated by references in its entirety) and electronic display message board 302 capable of being configured via computing functionality 100. As will be appreciated by those skilled in the relevant art(s) after reading the description herein, in an aspect of the present disclosure, plate 301 replicates the standard 6"×12" license plate and meet the configuration requirements per the American Association of Motor Vehicle Administrators (AAMVA). As will also be appreciated by those skilled the relevant art(s), many jurisdictions require a registration plate to be attached to both the front and rear of a vehicle, although certain jurisdictions require only one plate, which is usually attached to the rear of the vehicle. Thus, the present disclosure is sufficiently flexible and configurable, such that it may be implemented in ways other than that shown in the rear-end layout of FIG. 3. For example, plate 301 may be constructed as part of a vehicle's taillight, as a bolt-on, theft-deterrent module replacing existing license plates, or placed internally on the front and/or rear window dashboards.

Figure 4A:
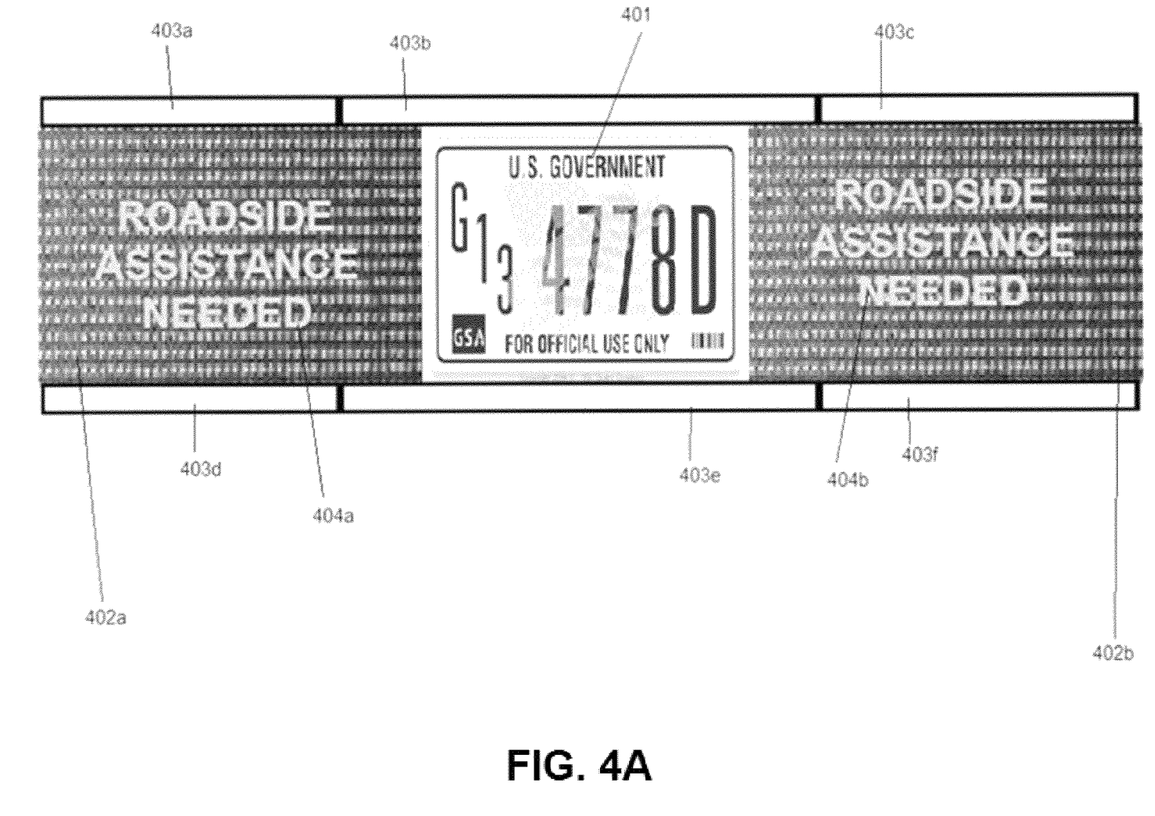
FIGS. 4A, 4B, and 4C are exemplary depictions of the multi-function electronic display license plate system during various circumstances of its operation, according to aspects of the present disclosure.

Referring now to FIG. 4A, an exemplary magnified view of multi-function electronic display license plate system 300 with a display created through process 200, according to an aspect of the present disclosure, is shown. In one aspect, user input into input module 114, along with the comparison process described in step 204 of process 200, indicates that the user is a user authorized to operate the selected vehicle. In such an aspect, electronic display license plate 401 and electronic display message boards 402a and 402b are available for use.

In another aspect, multi-function license plate system 300 includes one or more components 403a, 403b, 403c, 403d, 403e, and 403f, in such an aspect, these components include, but would not be limited to: (1) a to transponder which would allow vehicles to expedite the process of passing toll locations; (2) a position detecting sensor, as described in process 200, which allows the user to safely "reverse" without the risk of colliding into unseen objects; (3) a motion sensor, as described in process 200, which allows the user's vehicle to conserve energy by performing an action, such as dimming the display, while the vehicle is idle; (4) a theft deterrent/recovery GPS device which will allow the vehicle's owner to locate the vehicle if the vehicle was ever stolen or abandoned by its operator; (5) an emergency vehicle locator which links directly to individual first responder vehicles in an emergency situation; and (6) energy harvesting devices, such as solar panels or pulsation technology devices, which would allow for the multi-function electronic license plate system 300 to supplement the vehicle's power source.

In another aspect, electronic display message boards 404a and 404b would display emergency messages. Such emergency messages may be preprogrammed into computer system 100 or computer system 100 may be set up to received input from a input module 114 such as, but not limited to, an onboard touchscreen, keyboard, mouse, joystick, voice recognition software or the like. In such an aspect, the messages displayed by electronic display message boards 403a and 403b may be the same, or they may differ as determined by either the user or the programming of computer system 100.

In another aspect, the multi-function electronic license plate display system 300 can incorporate a mobile tagging system utilizing a specialized tag which can be scanned utilizing a mobile phone device. Said mobile tagging system can be used in multiple ways including, but not limited to, inventory of the vehicles and public safety reporting (i.e., a "how's my driving" type system).

Figure 4B:
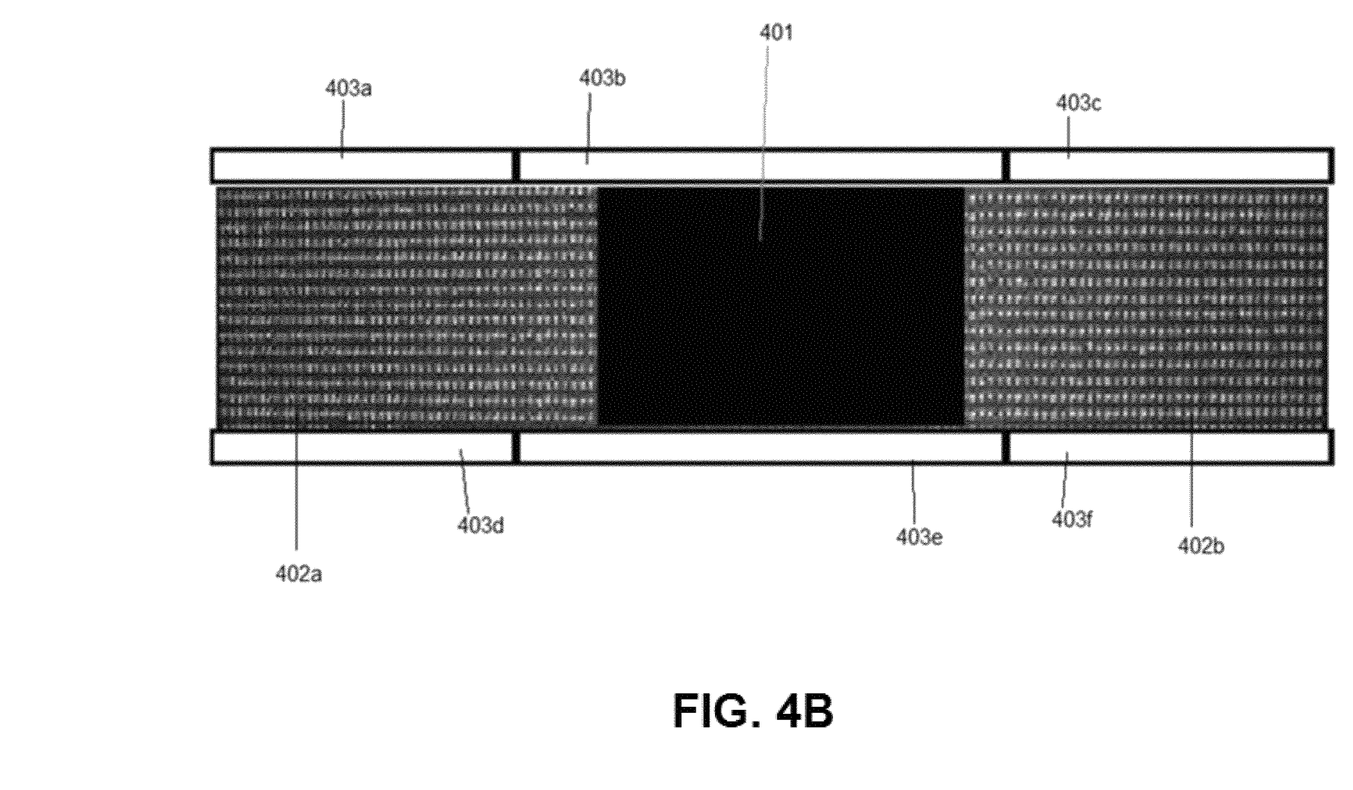

Referring to FIG. 4B, another exemplary magnified view of multi-function electronic display license plate system 300 with a display created through process 200, according to an aspect of the present disclosure, is shown. In one aspect, user input into input module 114, along with the comparison process described in step 204 of process 200, indicates that the user is not a user authorized to operate the selected vehicle. In such an aspect, electronic display license plate 401 and electronic display message boards 402a and 402b are not available for use by the user. In such an aspect, the programming of computer system 100 may prevent any of the components from activating, or may allow any or all of components 403a, 403b, 403c, 403d, 403e, and 403f to activate depending on programming and the needs of the vehicle owner and/or theft authorized users (e.g., rental vehicle, police, fire, EMT, government agency, or corporate fleet, or individual owner and the like).

Figure 4C:
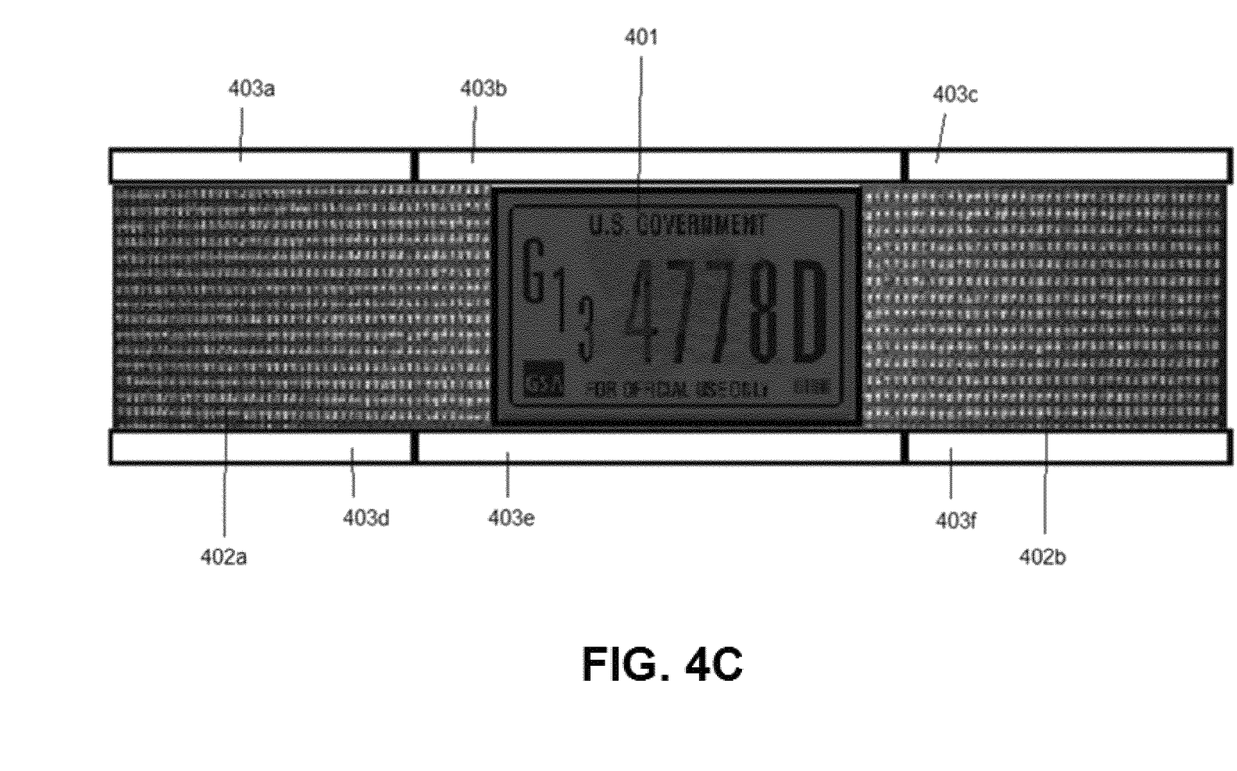

Referring to FIG. 4C, yet another exemplary magnified view of multi-function electronic display license plate system 300 with a display created through process 200, according to an aspect of the present disclosure, is shown. In one aspect, a motion sensor detected that the vehicle has remained idle longer than the predetermined time and computer system 100 sent a signal to display module 116 causing electronic display license plate 401 to "dim" as described in steps 212 and 213 of process 200. As described above, the action is not limited to "dimming," but may also include inverting the display and the like. In such an aspect, the use of electronic display message boards 402a and 403b and components 403a, 403b, 403c, 403d, 403e, and 403f are not affected by the action performed on electronic display license plate 401.

The figures shown in FIGS. 4A, 4B, and 4C are to be taken as an exemplary figure, not as a limitation. To those skilled in the relevant art(s), it is understood that the electronic display license plate 401 and electronic display message boards 402a and 402b although shown as a liquid crystal display (LCD) and light emitting diode (LED) displays respectively, can each individually be configured as a LCD, LED, or the like. Further, although the multi-function electronic display license plate is shown to incorporate components 403a, 403b, 403c, 403d, 403e, and 403f, the number and types of components can be changed to fit the needs of each vehicle owner and/or theft authorized user(s), and/or theft operating jurisdiction(s).

Further, as will be apparent to those skilled in the art(s) after reading the description herein, although an emphasis has been placed on governmental agency-owned vehicles, it was merely exemplary and not meant as a limitation of the present disclosure. The present disclosure is easily adaptable to any vehicle which requires a license plate to be displayed and is therefore not limited by the exemplary description and figures above. More generally, while various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and theft equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation upon vehicles and environments other than those mentioned herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

I claim:

1. A computer-implemented method for facilitating the display of information related to vehicle registration on an electronic license plate system having an electronic display license plate when the vehicle is being operated by an authorized user, the method comprising the steps of:
   receiving, via an input module associated with the electronic license plate system connected to a vehicle, user biometric identification information, after the vehicle is started;
   comparing the received user biometric identification information with authorized user information within an authorized users database;
   determining if the user is authorized to operate the vehicle based on the comparison of the user biometric identification information received from the user with the authorized user information within the authorized users database; and
   where when the determining step is positive:
      communicating to a computing system an instruction to activate the electronic display license plate to display vehicle registration information during the operation of the vehicle by the user; and
      deactivating the electronic display license plate at the conclusion of vehicle operation; and
   where when the determining step is negative the computing system does not receive the instruction to activate the electronic display license plate.

2. The method of claim 1, further comprising the steps of:
   identifying a current date;
   comparing the current date to a vehicle registration validity period; and
   visually alerting the user when the current date is outside the vehicle registration validity period.

3. The method of claim 2, wherein the visually alerting step comprises inverting the displayed vehicle registration information on the electronic license plate system.

4. The method of claim 1, further comprising the steps of:
   determining the vehicle has remained motionless for at least a pre-determined idle period;
   reducing the illumination of the electronic license plate system from an operating level; and
   increasing the illumination of the electronic license plate system to the operating level upon the vehicle resuming motion.

5. The method of claim 1, wherein the electronic license plate system further comprises first and second electronic message boards; and further comprising the steps of:
   receiving from the user, via a voice recognition system of the input module, a user message;
   displaying, via the first and second electronic message boards, the user message.

6. The method of claim 5, wherein the user message requests assistance.

7. A system for facilitating the display of information related to vehicle registration when the vehicle is being operated by an authorized user, comprising:
   an input module located on a vehicle, configured to receive user inputs from a user, the input module to receive user biometric identification information after the vehicle is started;

an electronic license plate system positioned on an end portion of a vehicle, configured to display vehicle registration information during the operation of the vehicle, the external display system comprises first and second electronic message boards and an electronic display license plate; and an authorization service, communicatively coupled with the input module, controlling the electronic license plate system, comprising an authorized user database containing authorized user information, the authorization service configured to compare biometric user inputs received at the input module with authorized user information;

wherein the information related to vehicle registration is supplied to the electronic license plate system by the authorization service when the user is authorized to operate the vehicle based on compared biometric user input;

wherein the information related to vehicle registration is displayed during authorized vehicle operation;

wherein the first electronic message boards displays a first emergency message and the second electronic message board displays a second emergency message, the first message and the second message are the same and messages displayed by the first and second electronic message boards are programmable by the user; and wherein when the user is not authorized to operate the vehicle, the electronic license plate system does not receive an instruction to activate the electronic license plate.

8. The system of claim 7, further comprising:
a registration module, communicatively coupled with the authorization service, configured to identify a current date, configured to compare the current date to a vehicle registration validity period;
wherein the authorization service is further configured to visually alert the user when the current date is outside the vehicle registration validity period.

9. The system of claim 7, wherein the electronic license plate system is integrated into the vehicle at the time of vehicle manufacture.

10. The system of claim 7, further comprising:
a housing configured to removably attach to an automobile at a license plate attachment location, containing the authorization service and the electronic license plate system.

11. The system of claim 7, further comprising:
an energy harvesting device coupled to the electronic license plate system and configured to supplement a vehicle's power source.

12. The system of claim 11, wherein the energy harvesting device is one of:
a solar panel; and
a pulsation technology device.

13. The system of claim 7, wherein:
the first and second electronic message boards are positioned on an end portion of a vehicle, communicatively coupled with the authorization service, configured to display the programmed messages to the surrounding environment; and
a voice recognition system to input the programmed messages.

14. The system of claim further comprising:
a toll transponder.

15. The system of claim 7, further comprising:
a position detecting sensor configured to detect obstacles near the vehicle; and
a user alert device communicatively coupled with the position detecting sensor, configured to alert the user when the position detecting sensor detects an obstacle.

16. The system of claim 7, further comprising:
a global positioning system module;
a communications service; and
a theft prevention module, communicatively coupled with the global positioning system module, communicatively coupled with the communications service, configured to provide the location of the vehicle via the communications service.

17. The system of claim 7, further comprising:
a motion sensor configured to detect vehicle motion; and
a power saving service, communicatively coupled with the authorization service, receiving inputs from the motion sensor, configured to determine when the vehicle has remained motionless for an idle period, reducing via the authorization service, the illumination of the electronic license plate system from an operating level and increasing the illumination of the electronic license plate system to the operating level upon the vehicle resuming motion.

18. One or more non-transitory, tangible computer storage media having stored thereon multiple instructions that facilitate the display of information related to vehicle registration when the vehicle is being operated by an authorized user, causing the one or more processors to:
receive, via an input module connected to a vehicle, biometric user identification information of a user, after the vehicle is started;
compare the received biometric user identification information with authorized user information within an authorized users database;
determine if the user is authorized to operate the vehicle based on the comparison of the received biometric user identification information with the authorized user information within the authorized users database;
where when the determining step is positive:
communicate an instruction to activate an electronic display license plate to display vehicle registration information during the operation of the vehicle by the user via at least one external display system positioned on an end portion of the vehicle; and
deactivate the electronic display license plate the conclusion of vehicle operation; and
where when the determining step is negative, the computing system does not receive the instruction to activate the electronic display license plate.

19. One or more non-transitory, tangible computer storage media as recited in claim 18, wherein the multiple instructions further cause one or more processors to:
identify a current date;
compare the current date to a vehicle registration validity period; and
visually alert the user when the current date is outside the vehicle registration validity period.

20. One or more non-transitory, tangible computer storage media as recited in claim 18, wherein the multiple instructions further cause one or more processors to:
receive from the user, via the input module, a user message selection;
display, via the electronic display license plate, a user message related to the received user message selection.

* * * * *